US010563972B2

(12) United States Patent
Tsukamoto

(10) Patent No.: US 10,563,972 B2
(45) Date of Patent: Feb. 18, 2020

(54) OVERLAP MEASURING APPARATUS AND OVERLAP MEASURING METHOD

(71) Applicant: BRIDGESTONE CORPORATION, Tokyo (JP)

(72) Inventor: Takahiro Tsukamoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 168 days.

(21) Appl. No.: 15/328,236

(22) PCT Filed: Jul. 23, 2015

(86) PCT No.: PCT/JP2015/070969
§ 371 (c)(1),
(2) Date: May 17, 2017

(87) PCT Pub. No.: WO2016/013613
PCT Pub. Date: Jan. 28, 2016

(65) Prior Publication Data
US 2017/0254638 A1  Sep. 7, 2017

(30) Foreign Application Priority Data
Jul. 23, 2014 (JP) ................. 2014-150067

(51) Int. Cl.
*G01B 11/04* (2006.01)
*B29D 30/30* (2006.01)
(Continued)

(52) U.S. Cl.
CPC ........ *G01B 11/043* (2013.01); *B29D 30/3007* (2013.01); *B65H 29/006* (2013.01);
(Continued)

(58) Field of Classification Search
CPC ............... G01B 11/043; G06T 7/70
See application file for complete search history.

(56) References Cited

U.S. PATENT DOCUMENTS

2008/0123113 A1  5/2008  Iwayama
2013/0009078 A1  1/2013  Inoue et al.
2014/0043601 A1  2/2014  Takahashi et al.

FOREIGN PATENT DOCUMENTS

CN  102865813 A  1/2013
CN  103196917 A  7/2013
(Continued)

OTHER PUBLICATIONS

Jun. 26, 2017 Search Report issued in European Patent Application No. 15824168.7.
(Continued)

*Primary Examiner* — Thai Q Tran
*Assistant Examiner* — Girumsew Wendmagegn
(74) *Attorney, Agent, or Firm* — Oliff PLC

(57) ABSTRACT

An apparatus and method accurately measures an amount of overlap in joining together the end portions of a sheet-shaped member constituting a tire. The overlap amount of the sheet-shaped member front and rear ends is measured when the sheet-shaped member having been molded into a predetermined length with molding marks extending on the surface in width direction is wound around the periphery of a molding drum from the front end. In doing so, a detector detects a first molding mark formed on the sheet-shaped member on the rear end side and a second molding mark formed on the sheet-shaped member on the front end side by capturing images of an entire area including the overlap from above by an image capturing device. A calculator calculates the amount of overlap by measuring the distance between the first and second molding marks on the sheet-shaped member from the frames of captured images.

9 Claims, 5 Drawing Sheets

(51) Int. Cl.
*G06T 7/70* (2017.01)
*B65H 29/00* (2006.01)
*G01B 11/14* (2006.01)
*H04N 5/247* (2006.01)

(52) U.S. Cl.
CPC ............... *G01B 11/14* (2013.01); *G06T 7/70* (2017.01); *H04N 5/247* (2013.01)

(56) References Cited

FOREIGN PATENT DOCUMENTS

| | | | |
|---|---|---|---|
| JP | S62-70704 A | | 4/1987 |
| JP | H09-5246 A | | 1/1997 |
| JP | H09-207240 A | | 8/1997 |
| JP | 11304435 | * | 5/1999 |
| JP | 2006-019070 A | | 1/2006 |
| JP | 2009-042114 A | | 2/2009 |
| JP | 2010-249702 A | | 11/2010 |
| JP | 2011-242176 A | | 12/2011 |
| WO | 2006/019070 A1 | | 2/2006 |

OTHER PUBLICATIONS

Jul. 2, 2018 Search Report issued in Chinese Patent Application No. 2015800398242.
Sep. 8, 2015 International Search Report issued in International Patent Application No. PCT/JP2015/070969.
Feb. 2, 2017 International Preliminary Report on Patentability issued in International Patent Application No. PCT/JP2015/070969.

\* cited by examiner

OVERLAP MEASURING APPARATUS AND OVERLAP MEASURING METHOD

BACKGROUND OF THE INVENTION

1. Field of the Invention

The present invention relates to an apparatus and method for measuring amounts of overlap of sheet-shaped members constituting a tire.

2. Description of the Related Art

Conventionally, a green tire is formed by winding sheet-shaped members, such as an inner liner, a carcass ply, belts, and a tread, having been molded into predetermined lengths of sheets, sequentially around a tire molding drum and attaching annularly formed beads to the carcass ply. Each of these sheet-shaped members is molded in advance into a predetermined length relative to the drum circumference dimension to create a predetermined amount of overlap between the winding start end and the winding completion end when it is wound around the molding drum. However, these sheet-shaped members, which are each made up of uncured rubber material, can get deformed with extension or shrinkage from the predetermined molding dimensions during conveyance or winding around the molding drum. Thus, there may be cases of excess or insufficient amount of overlap when the sheet-shaped members are actually wound around the molding drum.

The setting of the amount of overlap varies with the lap joint which retains the overlap state even after the subsequent process of curing and the butt joint which has a butted state of sheet after curing. Especially when the butt joint is employed, the amount of overlap at the time of molding needs to be accurate, and therefore the measurement of the amount of overlap is carried out to ensure that there is actually the predetermined amount of overlap after the sheet-shaped member is wound around the molding drum.

For example, the amount of overlap is measured using a plurality of two-dimensional laser sensors and an encoder for detecting the rotation of the molding drum. The plurality of laser sensors are set such that the light track of the cast laser light is slanted with respect to the width direction on the molding drum surface. And the plurality of laser sensors are arranged at a predetermined distance apart from each other so that the laser light cast from the respective laser sensors covers the whole width of the molding drum.

Firstly, a sheet-shaped member is wound around the molding drum with the laser light cast from the laser sensors, and the position of the winding start end crossing the light track of laser light is detected as the molding drum is rotated. At the same time, the distance of movement of the detected winding start end is detected by the encoder. Next, the length of the sheet-shaped member wound around the molding drum is measured by detecting the position of winding completion end crossing the light track of laser light as the molding drum is rotated. Now the amount of overlap is measured by determining the difference between the measured length of the sheet-shaped member and the circumference length of the molding drum.

RELATED ART DOCUMENT

Patent Document

Patent Document 1: Japanese Unexamined Patent Application Publication No. 2006-019070

SUMMARY OF THE INVENTION

Problem to be Solved by the Invention

However, the above-described method for measuring the amount of overlap can measure the length of the sheet-shaped member, but has difficulty in accurately measuring the amount of overlap and in determining a proper state of overlapping. Furthermore, when the winding completion end is rising up or rolling back relative to the winding start end, the overlapping is not properly executed even if the length measured is sufficient. As a result, the tire, when built up finally, must be disposed of as a defective tire.

Thus the present invention has been made to solve the foregoing problems, and an object of the invention is to provide a method for measuring the amount of overlap that can ensure correct overlapping of the ends of the sheet-shaped members and accurate measuring of the amount of overlap in joining the ends of the sheet-shaped members constituting a tire.

Means for Solving the Problem

To solve the above-described problems, the invention provides an overlap measuring apparatus for measuring an amount of overlap of a front end and a rear end of a sheet-shaped member when the sheet-shaped member having been molded into a predetermined length with molding marks extending on the surface in width direction thereof is wound from the front end thereof around the periphery of a molding drum. The apparatus includes a detecting means for detecting a first molding mark formed on the surface of the sheet-shaped member on the rear end side and a second molding mark formed on the surface of the sheet-shaped member on the front end side by capturing images of an entire area including the overlap from above by image capturing means and a calculating means for calculating the amount of overlap by measuring the distance between the first molding mark and the second molding mark on the sheet-shaped member from the frames of captured images.

Also, to solve the above-described problems, the invention provides an embodiment of a method for measuring an overlap of a front end and a rear end of a sheet-shaped member when the sheet-shaped member having been molded into a predetermined length with molding marks extending on the surface in width direction thereof is wound from the front end thereof around the periphery of a molding drum. The method includes detecting a first molding mark formed on the sheet-shaped member on the rear end side and a second molding mark formed on the sheet-shaped member on the front end side by capturing images of an entire area including the overlap from above by image capturing means and calculating the amount of overlap by measuring the distance between the first molding mark and the second molding mark on the sheet-shaped member from the frames of captured images.

Hereinafter, the invention will be described in detail based on preferred embodiments which do not intend to limit the scope of the claims of the present invention but exemplify the invention. And all of the features and the combinations thereof described in the embodiments are not necessarily essential to the invention, and they also include constructions and arrangements to be employed selectively.

BEST MODE FOR CARRYING OUT THE INVENTION

Figure 1:
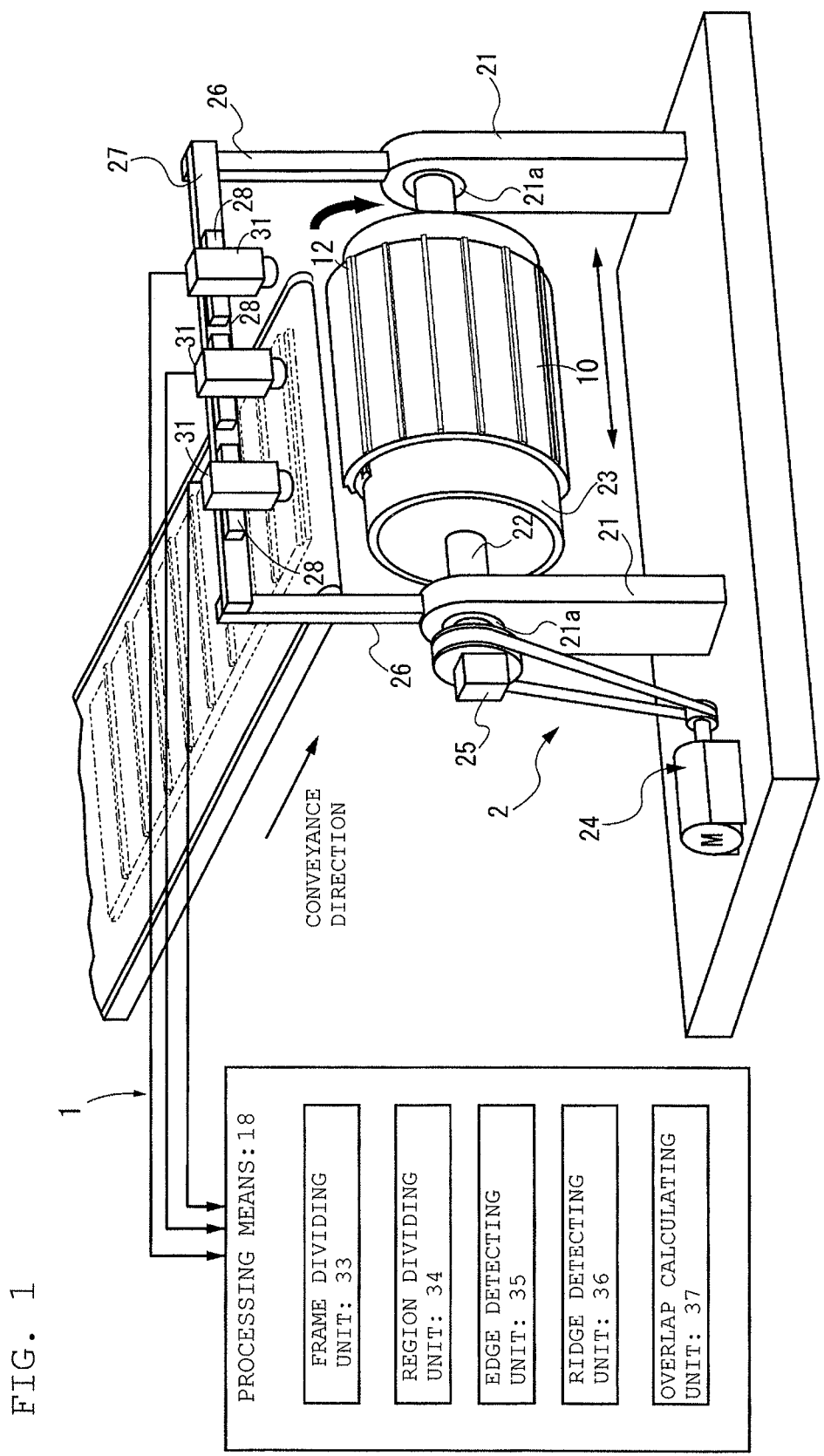
FIG. 1 is a schematic illustration showing a configuration of an overlap measuring apparatus according to the present invention.

FIG. 1 is a schematic illustration showing a configuration of an overlap measuring apparatus 1 and a method for measuring the amount of overlap according to the present invention.

As shown in the figure, a molding drum apparatus 2 for molding sheet-shaped members includes, to put it roughly, a pair of support posts 21 installed upright a predetermined distance spaced apart from each other, an axle 22 supported rotatably by the support posts 21, a molding drum 23 attached to the axle 22, and a drive mechanism 24 for driving the axle 22.

The pair of support posts 21, 21 has bearings 21a, 21a in the upper end thereof, which support the axle 22 enabling the rotation of the molding drum 23. Fastened coaxially to the axle 22 is the molding drum 23 having a cylindrical cross section. Attached to one end of the axle 22 is an encoder 25 for detecting the rotation angle of the molding drum 23.

Figure 2:
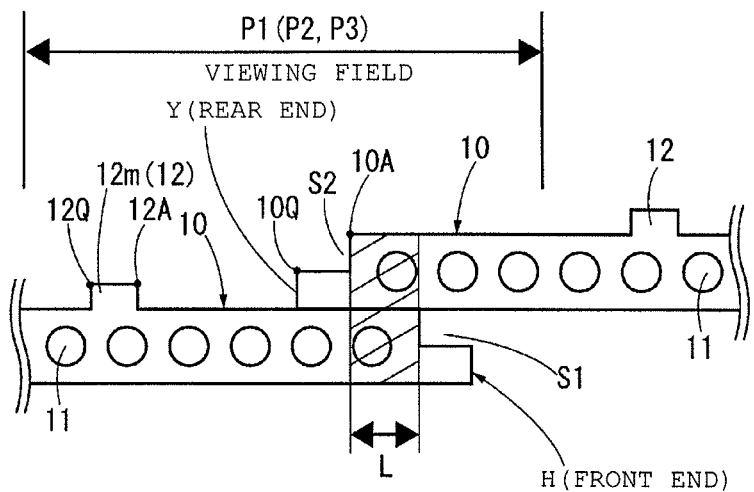
FIG. 2 is a schematic illustration showing an overlap of a carcass ply.

The molding drum 23 serves as a base on which the sheet-shaped members are wound in tire molding. The sheet-shaped members having been brought on a conveyor 20 are wound around the circumference of the molding drum 23. The forefront of the conveyor 20 is located in correspondence to the winding start position in the upper part of the molding drum 23, and the conveyor 20 sends out a carcass ply 10 toward the molding drum 23 at the same speed as the circumferential speed of the molding drum 23. In the description of the present embodiment, a sheet-shaped member to be wound around the periphery of the molding drum 23 is represented by a carcass ply 10 having carcass cords 11 embedded therein as shown in FIG. 2.

The carcass ply 10 is made of synthetic rubber having a predetermined length (circumferential length of the molding drum 23) and a predetermined width. The carcass ply 10 has a length that approximately goes full circle around the molding drum 23 and has carcass cords 11 embedded therein which extend in the width direction thereof at predetermined intervals. Formed on the surface of the carcass ply 10 are ridges 12, which are protrusions having a rectangular cross section formed when it is molded on the molding drum 23. The carcass ply 10 incorporates the carcass cords 11 by sandwiching them between two uncured rubber sheets each with an adhesive layer. The molding surface of the shaping die has rectangularly recessed air vent grooves for expelling air from between the shaping die and the rubber sheet surface when the carcass ply 10 wound around the drum is molded. The ridges 12 are therefore the remainder marks left by the rectangular grooves. The air vent grooves, formed at predetermined intervals on the surface of the shaping die, leave their marks extending in the width direction at predetermined intervals on the surface of the carcass ply 10 after its molding.

At the overlap of the carcass ply 10, the rear end (winding completion end) Y is lapped on the front end H on the winding start end side thereof. Formed at the end of the front end H side is an L-shaped stepped portion S1 facing the underside surface (inner surface) of the rear end Y. Also, formed at the end of the rear end Y side of the carcass ply 10 is an L-shaped stepped portion S2 facing outward of the carcass ply 10. That is, when the overlap is formed with the carcass ply 10 wound around the molding drum 23, the stepped portion S2 faces outward at the overlap with the surface side of the stepped portion S2 becoming the edge 10A. In the present example, the stepped portion S2 having the edge 10A is referred to as the first molding mark. The ridges 12, formed at predetermined intervals on the surface of the carcass ply 10, are protruding portions extending in the width direction thereof, which are each referred to as the second molding mark. Of the corners of the ridge 12m as a second molding mark closer to the edge 10A of the rectangular ridges 12, the corner on the edge 10A side is referred to as the ridge corner 12A. It is to be noted that the stepped portions S1 and S2 are formed stepwise to allow for easy removal of the carcass ply 10 from the upper and lower shaping dies which mold the carcass ply 10 by sandwiching the carcass cords 11 between the uncured rubber sheets.

In the present embodiment, the amount of overlap L is determined by measuring the interval distance between the edge 10A as a corner formed on the rear end Y side and the ridge corner 12A of the ridge 12m formed on the surface of the front end H side. It is to be noted that the edge 10Q is formed together with the edge 10A and that the ridge corner 12Q is formed together with the ridge corner 12A on the ridge 12.

The drive mechanism 24 which causes the rotation of the molding drum 23 comprises a motor as a drive source and a transmission mechanism for transmitting the rotative force of the motor to the axle 22. Thus the rotation of the motor results in the rotation of the axle 22 and the molding drum 23. And the rotation angle of the axle 22 is detected by the encoder 25 as the rotation angle of the molding drum 23. The encoder 25 stops the molding drum 23 by outputting a stop signal to the processing means 32 when one revolution of the molding drum 23 is completed as the rear end Y, which is the winding completion end, overlaps the front end H, which is the winding start end, as the winding of the carcass ply 10 completes from the front end H to the rear end Y. At this time, a stopping control of the molding drum 23 is performed such that the area from the overlap having the amount of overlap L to the ridge 12m closest to the rear end Y is located opposite to the CCD cameras as image capturing means arranged at equal intervals in the width direction. By this arrangement, the images of both the edge 10A, which is one molding mark, and the ridge corner 12A, which is the other molding mark, are captured.

Attached to the support posts 21 supporting the molding drum 23 are respective extension posts 26 which extend upward in extension of the support posts 21. Attached to the upper ends of the extension posts 26 is a bridging member 27 which join the extension posts 26 together by extending in parallel with the axle center of the molding drum 23. Attached to the bridging member 27 are three CCD cameras 31, 31, 31 as the above-mentioned image capturing means. The cameras 31 are attached individually to their respective moving mechanisms 28, which are provided on the bridging member 27 by the same number as that of the cameras 31.

The moving mechanisms 28 support the cameras 31 movably along the extension direction of the bridging member 27 (the width direction of the carcass ply 10). At the same time, the moving mechanisms 28 adjust the positions of the cameras 31 relative to the width of the carcass ply 10 to be wound by moving them in the width direction thereof. Accordingly, the images of the width ends of the carcass ply 10 can be captured whatever width the carcass ply 10 takes. That is, in the present embodiment, the positions of the cameras 31, 31, 31 are adjusted using the moving mechanisms 28 such that the images of the width center, the left end, and the right end of the carcass ply 10 can be captured whatever width the carcass ply 10 takes in relation to the molding drum 23.

It is to be noted that when the carcass ply 10 is wound with one of the width ends of the molding drum 23 as the benchmark, the camera on the benchmark side may be directly fixed to the bridging member 27.

The processing means 32 comprises the three cameras 31, a region dividing unit 34 for calculating the amount of overlap by processing the images captured by the plurality of cameras 31, an edge detecting unit 35, a ridge detecting unit 36, and an overlap calculating unit 37.

The three cameras 31 are area cameras that make it possible to capture the images of predetermined regions of frame. The cameras 31 thus capture the images of the predetermined area including the overlap of the carcass ply 10 wound around the molding drum 23 where the winding start end and the winding completion end thereof overlap each other.

For example, the left and the right cameras 31 are so set that their image focuses are set in positions that are a predetermined distance from the respective width ends of the carcass ply 10 wound around the molding drum 23 toward the width center thereof. That is, their image focuses are set 50 mm from the respective width ends toward the width center thereof. The center camera 31 located in between the left and the right cameras 31 for capturing the images of their respective sides is disposed in a position that divides equally the interval between the left and the right cameras 31. The image captured by the plurality of cameras 31 is outputted to the processing means 32 which constitutes the means (process) for calculating the amount of overlap of the present invention. The left camera 31, the central camera 31, and the right camera 31 constitute the detecting means (process) of the present invention.

The three cameras 31 may be either of color cameras and black-and-white cameras, and the color or black-and-white images captured are converted into the gray scale and processed by the processing means. It is to be noted that the black-and-white image is not limited to the gray scale of white to black, but may be of one of the colors RGB constituting a color image. It is also to be noted that the cameras 31 are all of the same kind, and it goes without saying that the number of the cameras 31 is not limited to three.

The processing means 32, which is a so-called computer, is equipped with a CPU as a means for processing images captured by the cameras 31 and calculating the amount of overlap L, a ROM and RAM as storage means for storing programs for image processing and calculation of the amount of overlap L, and I/O interfaces as communication means. Connected to the I/O interfaces are a not-shown operation panel as an input means for inputting parameters for image processing and a monitor as a display output means for displaying the images captured by the cameras 31 and the amount of overlap L as the result of processing.

Figure 6:
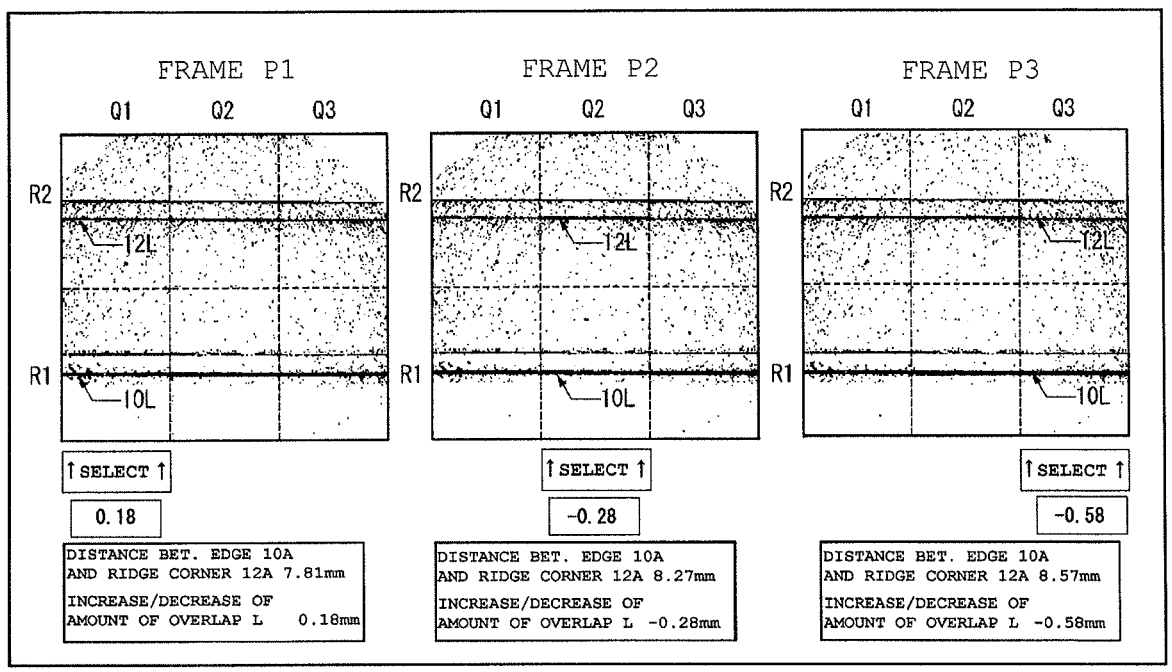
FIG. 6 is an illustration showing the results of measurement displayed on the monitor.

As shown in FIG. 6, the processing means 32 includes a frame dividing unit 33, which divides each of the frames P1, P2, P3 of images captured by the respective cameras 31 into, for instance, three blocks Q1, Q2, Q3 in the width direction, a region dividing unit 34, which divides, for instance, the center block Q2 into two upper and lower regions R1 and R2, an edge detecting unit 35, which detects the edge 10A of the rear end Y from one of the divided regions R1, a ridge detecting unit 36, which detects the ridge corner 12A of the ridge 12 closest to the edge 10A (closest to the rear end Y), and an overlap calculating unit 37, which calculates the amount of overlap L based on the detected edge 10A and ridge corner 12A of the ridge 12.

Figure 4A:
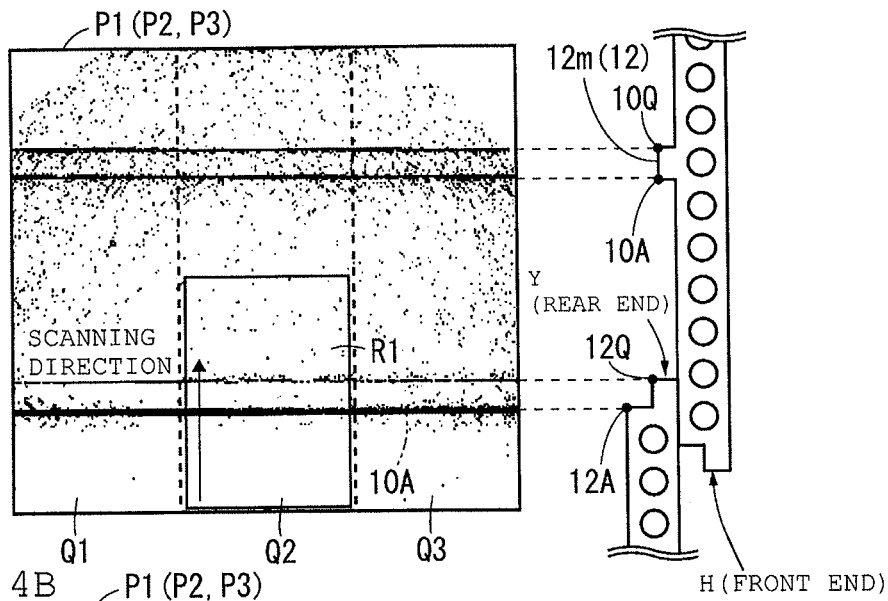
FIGS. 4A-4C are schematic illustrations showing the steps of detecting edges and ridges and the method of calculating the amount of overlap.
Figure 4B:
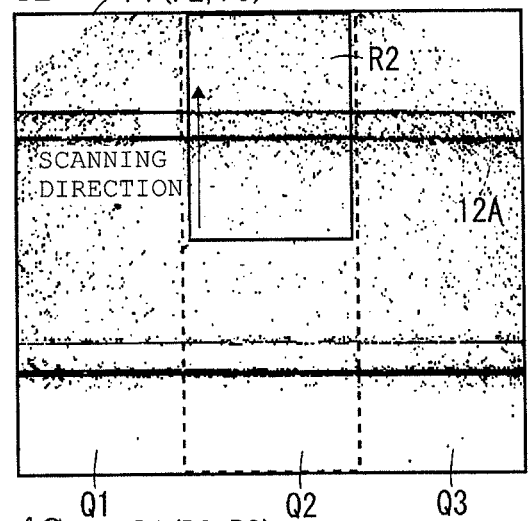
Figure 4C:
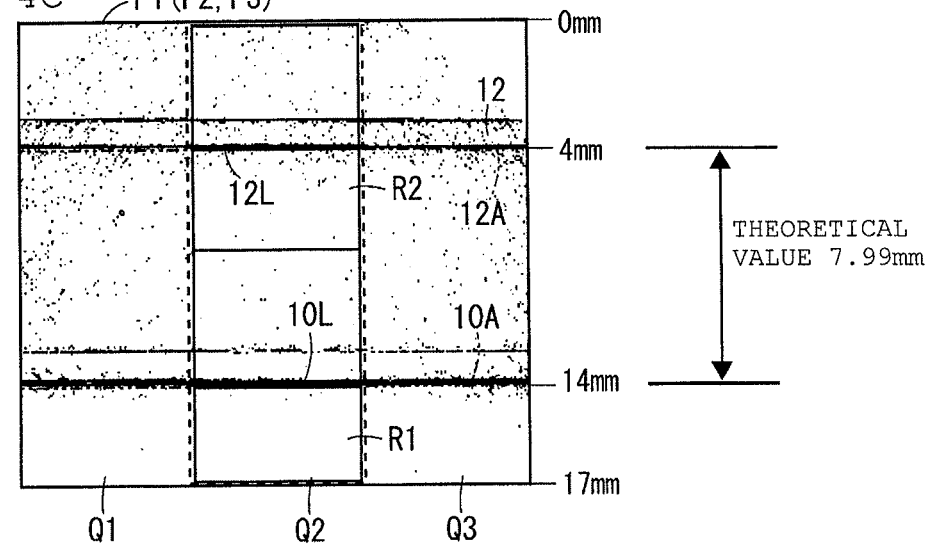

FIGS. 4A to 4C show photo images of frame P1. As shown in the figures, the overlap is represented in gray graded black.

As shown in FIG. 4A, the edge detecting unit 35 detects the edge line 10L by scanning the region R1 on the edge 10A side and detecting the edge 10 A of the rear end Y of the carcass ply 10. More specifically, the edge detecting unit 35 first scans the sequence of pixels located at the left end of the region R1 from the lower end to the upper end thereof. Upon completion of scan of the sequence of pixels, the edge detecting unit 35 scans the adjacent sequence of pixels on the right from the lower end to the upper end. By repeating this process to the right end, the edge detecting unit 35 detects the pixels assumed to represent the edge 10A. By this scanning, the detection is made based on the gray values of the pixels constituting the image captured. That is, the pixels are detected as part of the image of the edge 10A when the luminance values of the pixels are at or above the predetermined threshold value. The coordinate positions in the region R1 on the edge 10A side of the pixels thus detected are stored together with their luminance values.

The description thus far has been such that the pixels having the luminance values at or above the threshold value are detected as a straight line when they are linearly continuous in the width direction of the region R1. However, the arrangement may also be such that the pixels having the luminance values at or above the threshold value may be detected as a straight line if they are found continuous within a width of a predetermined number of pixels above and below the line.

Next, the edge detecting unit 35 determines the arrangement of the detected pixels. That is, the edge detecting unit 35 detects the pixels detected in the above-described process as a straight line when they are found continuously linear in a row in the width direction from the left end to the right end of the region R1. Further, the edge detecting unit 35 detects the straight line whose vertical coordinate position in the region R1 is located at the lowest position of the detected straight lines as the edge line 10L corresponding to the edge 10A and has it stored in a not-shown memory. In this manner, the position of the edge 10A is set.

As shown in FIG. 4B, the ridge detecting unit 36 detects the ridge line 12L corresponding to the ridge corner 12A, which is the edge of the ridge 12 closest to the edge 10A on the carcass ply 10, by scanning the region R2 on the ridge 12 side. More specifically, the ridge detecting unit 36 first scans the sequence of pixels located at the left end of the region R2 from the lower end to the upper end thereof. Upon completion of scan of the sequence of pixels, the ridge detecting unit 36 scans the adjacent sequence of pixels on the right from the lower end to the upper end. By repeating this process to the right end sequence of pixels, the ridge detecting unit 36 detects the pixels assumed to represent the ridge corner 12A. By this scanning, the detection is made based on the gray values of the pixels constituting the image captured. That is, the pixels are detected as part of the image of the ridge corner 12A when the luminance values of the pixels are at or above a predetermined threshold value. The coordinate positions in the region R2 of the pixels thus detected are stored together with their luminance values.

Next, the ridge detecting unit 36 determines the arrangement of the detected pixels. That is, the ridge detecting unit 36 detects the pixels detected in the above-described process as a straight line when they are found continuous in a row in the width direction from the left end to the right end of the region R2. Further, the ridge detecting unit 36 detects the straight line whose vertical coordinate position in the region R2 is located at the lowest position of the detected straight lines as the ridge line 12L corresponding to the ridge corner 12A and has it stored in a not-shown memory. In this manner, the position of the ridge corner 12A is set.

The overlap calculating unit 37 calculates the amount of overlap L based on the measurement of the interval between the edge line 10L detected by the edge detecting unit 35 and the ridge line 12L detected by the ridge detecting unit 36 within the block Q2.

The frames P1, P2, P3 captured by the respective cameras 31 are each divided into a plurality of blocks Q1, Q2, Q3. This makes it possible to detect different amounts of overlap in the frames P1, P2, P3. That is, since the amounts of overlap in the frames P1, P2, P3 vary with the positions where the images are captured, the amounts of overlap in blocks Q1, Q2, Q3 are measured by dividing the frames P1, P2, P3 into the plurality of blocks Q1, Q2, Q3 along the extension direction of the overlap of the front end H and the rear end Y. As a result, the state of overlap can be grasped accurately.

Also, the blocks Q1, Q2, Q3 dividing the frames P1, P2, P3 are each further divided into the upper and lower regions R1 and R2. And the edge 10A and the ridge corner 12A located within the regions R1 and R2 are detected individually. This can simplify the algorism for the detection of the edge 10A and the ridge corner 12A.

In other words, as shown in FIGS. 4A and 4B, the images capture both the winding completion end Y and the ridge 12m. With the blocks Q1 to Q3 divided into upper and lower regions, the lower region R1 shows only the image of the winding completion end Y, whereas the upper region R2 shows only the image of the ridge 12m. The edge 10A and the edge 10Q remain in the lower region R1, whereas the ridge corner 12A and the ridge corner 12Q remain in the upper region R2. In the present embodiment, the edge 10A and the ridge corner 12A are located on the lower side in each of the regions R1 and R2. Thus the same algorism can be used for the program of scanning each of the regions R1 and R2. As a result, it is possible to detect the edge 10A and the ridge corner 12A with an improved processing speed.

For example, as shown in FIG. 4C, let us assume the case where the distance M from the upper end to the lower end of each of the frames P1, P2, P3 is set at 17 mm. In this case, when the detected ridge line 12L is located at 4 mm from the upper end and the edge line 10L at 14 mm from the upper end, the distance between the edge 10A and the ridge corner 12A is 14 mm−4 mm=10 mm. Next, the amount of overlap L is calculated from the distance between the edge 10A and the ridge corner 12A. If the theoretical distance between the edge 10A and the ridge corner 12A calculated in advance at the ply molding process is 7.99 mm, then the amount of overlap L runs short by 10 mm−7.99 mm=1.81 mm. In this manner, it is possible to calculate the shortage or excess of the amount of overlap L by subtracting the calculated distance between the edge 10A and the ridge corner 12A from the previously stored correct distance between the edge 10A and the ridge corner 12A.

As described above, the three-dimensional overlap of the front end H and the rear end Y of the carcass ply 10 is captured from above in 2D, or planar, images. And the distance from the first molding mark to the second molding mark is measured from these images. As the result, the amount of overlap can be measured with accuracy without being affected by the surface unevenness, warpage, or lifting of the overlap or 3D variation in the thickness of the sheet-shaped member.

Also, the edge line 10L corresponding to the edge 10A and the ridge line 12L corresponding to the ridge corner 12A are detected by the gray values of the luminance values of the pixels constituting a frame P. Thus clear-cut gray values may not be obtained in the detection of the ridge corner 12A and the edge 10A if there is a lifting of the edge 10A in the overlap or if there exist molding defects having occurred on the ridge 12 in the molding of the sheet-shaped member. Then the gray values fall below the threshold value, and the ridge line 12L and the edge line 10L are detected as "defective". In such cases, the amount of overlap L is not calculated, and the detection is determined to be "measurement failure (measurement error)" or "defective joint".

Hereinbelow, with reference to a preferred embodiment, a description will be given of a method for calculating the amount of overlap L using an overlap measuring apparatus 1 of the present invention.

Figure 3:
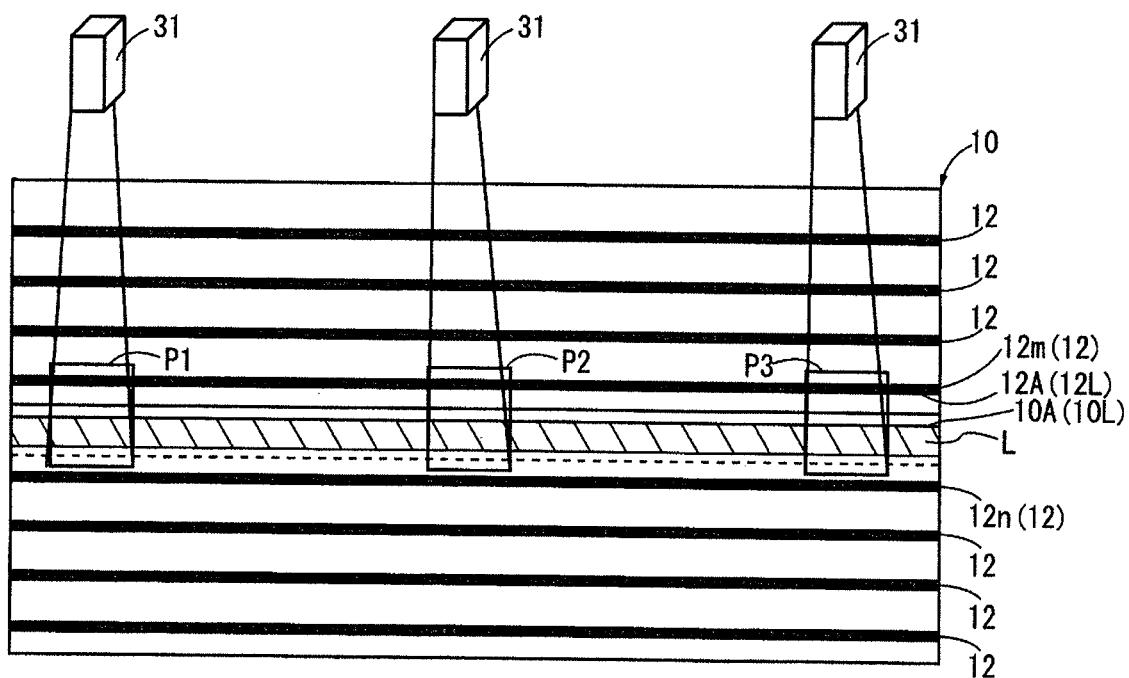
FIG. 3 is an illustration showing capturing of images of the overlap with image capturing means.
Figure 5:
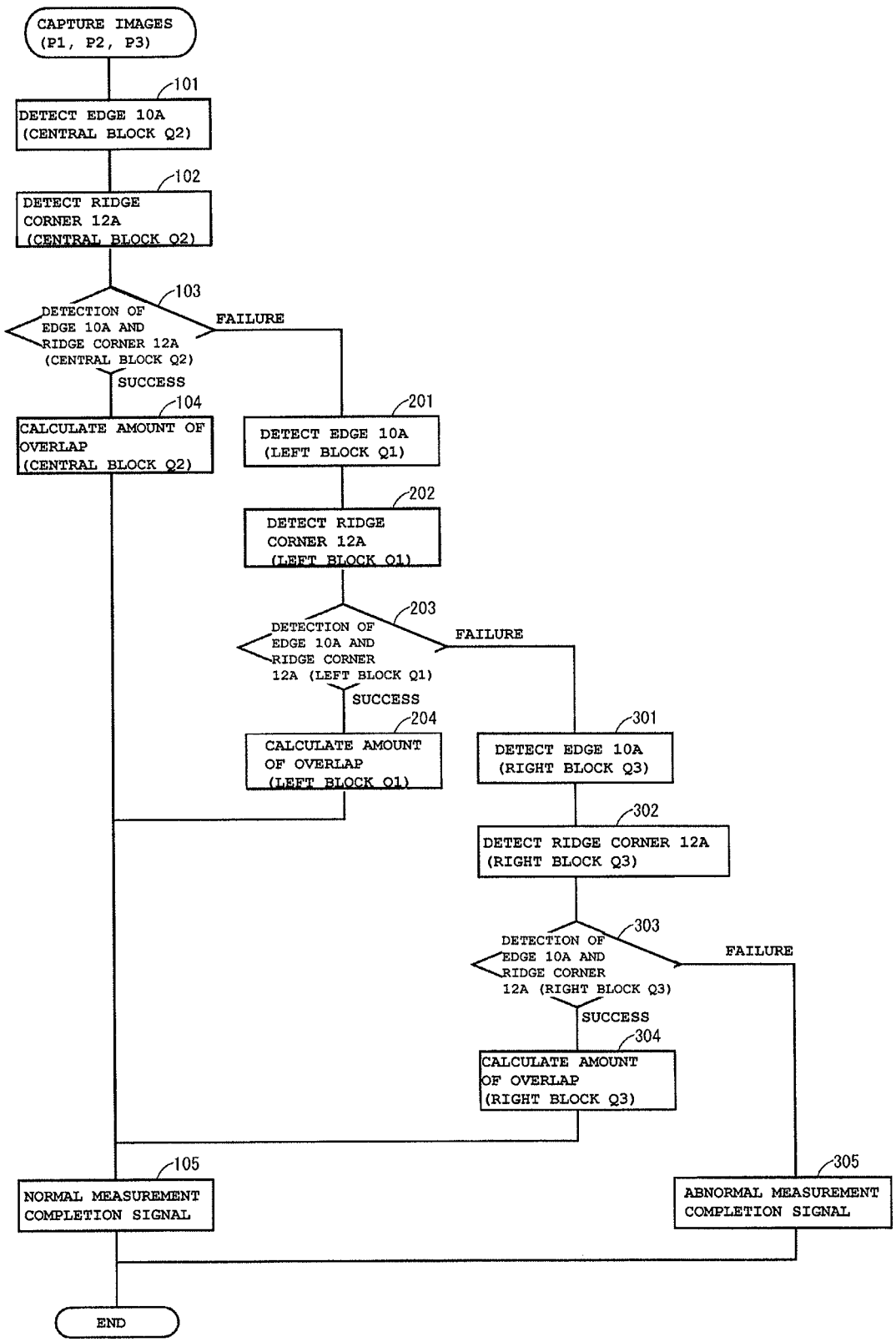
FIG. 5 is a flowchart showing a calculation of the amount of overlap by processing means.

In this embodiment, a description is given on the assumption that the amount of overlap L is captured by, for example, three cameras 31 as shown in FIG. 1 and FIG. 3. Of the frames captured by the respective cameras 31, the frame of the image captured by the left camera 31 with respect to the conveyance direction of the carcass ply 10 is denoted by P1, the frame of the image captured by the central camera 31 by P2, and the frame of the image captured by the right camera 31 by P3. The frames P1 to P3 are processed according to the flowchart shown in FIG. 5 (see FIG. 6).

Firstly, the amount of overlap L is calculated from the frame P1 captured by the left camera 31.

The frame P1 is first divided into three blocks equal in size in the width direction, namely, left block Q1, central block Q2, and right block Q3, by the frame dividing unit 33.

The divided blocks Q1 to Q3 are each further divided into region R1 on the edge 10A side and region R2 on the ridge 12m side.

On completion of division of each frame P1/each block into the plurality of regions R1 and R2, the processing to calculate the amount of overlap L for the region R1 and the region R2 is executed from the central block Q2.

In step 101, the region R1 on the edge 10A side in the central block Q2 is called up, and the edge 10A of the rear end Y, which is one of the ends of the carcass ply 10, is detected from the region R1 by the edge detecting unit 35. In this step of edge detection, the region R1 is scanned, and the luminance values of the pixels constituting the region R1 are compared with the threshold value $\alpha$. And the pixels whose luminance value is at or above the threshold value $\alpha$ are detected as representing the edge 10A. Then the pixels having the luminance value at or above the threshold value $\alpha$ which are linearly continuous all across the region R1 in the width direction are detected as a straight line, and the straight line located at the lowest position among the straight lines detected in the region R1 is detected as the edge line 10L. On the other hand, when there are no such pixels linearly continuous all across the region in the width direction, it is determined that there is no edge line 10L detected.

Next, in step 102, the region R2 on the ridge 12 side in the central block Q2 is called up, and the ridge corner 12A of the ridge 12 exposed on the surface in the closest proximity to the edge 10A on the front end H side, which is the other of the ends of the carcass ply 10, is detected from the region R2 by the ridge detecting unit 36. In this step of ridge detection, the region R2 is scanned, and the luminance values of the pixels constituting the region R2 are compared with the threshold value α. And the pixels whose luminance value is at or above the threshold value α are detected as representing the ridge corner 12A. Then the pixels having the luminance value at or above the threshold value α which are linearly continuous all across the region R2 in the width direction are detected as a straight line, and the straight line located at the lowest position among the straight lines detected in the region R2 is detected as the ridge line 12L. On the other hand, when there are no such pixels linearly continuous all across the region in the width direction, it is determined that there is no ridge line 12L detected.

Next, in step 103, success or failure in the detection of the edge line 10L in step 101 and the ridge line 12L in step 102 is determined. When only one of the straight lines of the edge line 10L and the ridge line 12L is detected, the procedure goes to step 201 as a failure in the detection of "ridge corner 12A and edge 10A". And when the edge line 10L and the ridge line 12L are both detected, the procedure goes to step 104 as a success in the detection of "ridge corner 12A and edge 10A".

When a success in the detection of "ridge corner 12A and edge 10A" is determined in step 103, the amount of overlap L is calculated in step 104. On completion of calculation of the amount of overlap L in step 104, the procedure goes to step 105, where a normal measurement completion signal is outputted. This will return the procedure to step 101, and now the calculation of the amount of overlap L in the central frame P2 is performed.

Also, when a failure in the detection of "ridge corner 12A and edge 10A" is determined in step 103, the procedure goes to step 201, where the amount of overlap L is performed from the left block Q1.

In step 201, the region R1 on the edge 10A side in the left block Q1 is called up, and the edge 10A of the rear end Y, which is one of the ends of the carcass ply 10, is detected from the region R1 by the edge detecting unit 35. In this step of edge detection, the region R1 is scanned, and the luminance values of the pixels constituting the region R1 are compared with the threshold value β. And the pixels whose luminance value is at or above the threshold value β are detected as representing the edge 10A. Note here that the threshold value β is to be set such that the criterion for the luminance values is lower than that of the threshold value α. Then the pixels having the luminance value at or above the threshold value β which are linearly continuous all across the region R1 in the width direction are detected as a straight line, and the straight line located at the lowest position among the straight lines detected in the region R1 is detected as the edge line 10L. On the other hand, when there are no such pixels linearly continuous all across the region in the width direction, it is determined that there is no straight line, or no edge line 10L detected.

Next, in step 202, the region R2 on the ridge corner 12A side of the ridge 12 in the left block Q1 is called up, and the ridge corner 12A exposed on the surface in the closest proximity to the edge 10A on the front end H side, which is the other of the ends of the carcass ply 10, is detected from the region R2 by the ridge detecting unit 36. In this step of ridge detection, the region R2 is scanned, and the luminance values of the pixels constituting the region R2 are compared with the threshold value β. And the pixels whose luminance value is at or above the threshold value β are detected as representing the ridge corner 12A.

Then the pixels having the luminance value at or above the threshold value β which are linearly continuous all across the region R2 in the width direction are detected as a straight line, and the straight line located at the lowest position among the straight lines detected in the region R2 is detected as the ridge line 12L. On the other hand, when there are no such pixels linearly continuous all across the region in the width direction, it is determined that there is no straight line, or no ridge line 12L detected.

Next, in step 203, success or failure in the detection of the edge line 10L in step 201 and the ridge line 12L in step 202 is determined. When only one of the straight lines of the edge line 10L and the ridge line 12L is detected, the procedure goes to step 301 as a failure in the detection of "ridge corner 12A and edge 10A". And when the edge line 10L and the ridge line 12L are both detected, the procedure goes to step 204 as a success in the detection of "ridge corner 12A and edge 10A".

When a success in the detection of "ridge corner 12A and edge 10A" is determined in step 203, the amount of overlap L is calculated in step 204. On completion of calculation of the amount of overlap L in step 204, the procedure goes to step 105, where a normal measurement completion signal is outputted. This will return the procedure to step 101, and now the calculation of the amount of overlap L in the central frame P2 is performed.

Also, when a failure in the detection of "ridge corner 12A and edge 10A" is determined in step 203, the procedure goes to step 301, where the amount of overlap L is performed from the right block Q3.

In step 301, the region R1 on the edge 10A side in the right block Q3 is called up, and the edge 10A, which is one of the ends of the carcass ply 10, is detected from the region R1 by the edge detecting unit 35. In this step of edge detection, the region R1 is scanned, and the luminance values of the pixels constituting the region R1 are compared with the threshold value γ. And the pixels whose luminance value is at or above the threshold value γ are detected as representing the edge 10A. Note here that the threshold value γ is to be so selected that the criterion for the luminance values is stricter than that of the threshold value α. Then the pixels having the luminance value at or above the threshold value γ which are linearly continuous all across the region R1 in the width direction are detected as a straight line, and the straight line located at the lowest position among the straight lines detected in the region R1 is detected as the edge line 10L. On the other hand, when there are no such pixels linearly continuous all across the region in the width direction, it is determined that there is no straight line, or no edge line 10L detected.

Next, in step 302, the region R2 on the ridge 12 side in the right block Q3 is called up, and the ridge corner 12A exposed on the surface in the closest proximity to the edge 10A on the rear end Y side, which is the other of the ends of the carcass ply 10, is detected from the region R2 by the ridge detecting unit 36. In this step of ridge detection, the region R2 is scanned, and the luminance values of the pixels constituting the region R2 are compared with the threshold value γ. And the pixels whose luminance value is at or above the threshold value γ are detected as representing the ridge corner 12A. Then the pixels having the luminance value at or above the threshold value γ which are linearly continuous all across the region R2 in the width direction are detected as a straight line, and the straight line located at the lowest position among the straight lines detected in the region R2 is detected as the ridge line 12L. On the other hand, when there are no such pixels linearly continuous all across the region in the width direction, it is determined that there is no straight line, or no ridge line 12L detected.

Next, in step 303, success or failure in the detection of the edge line 10L in step 301 and the ridge line 12L in step 302 is determined. When only one of the straight lines of the edge line 10L and the ridge line 12L is detected, the procedure goes to step 401 as a failure in the detection of "ridge corner 12A and edge 10A". And when the edge line 10L and the ridge line 12L are both detected, the procedure goes to step 304 as a success in the detection of "ridge corner 12A and edge 10A".

When a success in the detection of "ridge corner 12A and edge 10A" is determined in step 303, the amount of overlap L is calculated in step 304. On completion of calculation of the amount of overlap L in step 304, the procedure goes to step 105, where a normal measurement completion signal is outputted. This will return the procedure to step 101, and now the calculation of the amount of overlap L in the central frame P2 is performed.

Also, when a failure in the detection of "ridge corner 12A and edge 10A" is determined in step 303, the procedure goes to step 305, where the procedure is completed as an abnormal detection completion, and the calculation of the amount of overlap L in the central frame P2 is performed. It is to be noted that at the abnormal detection completion, an abnormal detection completion signal is outputted.

On completion of processing from step 101 through step 305, the processing to calculate the amount of overlap L in the central frame P2 is carried out according to the above-described steps. And when the calculation of the amount of overlap L in the central frame P2 is finished, the calculation of the amount of overlap L in the right frame P3 is carried out to complete the procedure for measuring the amount of overlap.

In the above-described embodiment, different threshold values α, β, and γ are set for the blocks Q1 to Q3, respectively, of each of the frames P1 to P3. And the regions R1 and R2 in each of the blocks Q1 to Q3 to detect the images of the edge 10A and the ridge corner 12A. As a result, it is possible to determine the presence or absence of the edge 10A and the ridge corner 12A in each of the captured frames P1 to P3 without being affected by the surface condition of the carcass ply 10 or the condition of image capturing. Therefore, it is possible to detect not only the amount of overlap L but also the state of overlap.

FIG. 6 shows an example of the results displayed on the monitor of the calculation of the amount of overlap L from the frames P1, P2, and P3, respectively. The calculations have been done using the algorism shown in the above-described flowchart. Displayed on the screen are the captured images of frame P1, P2, or P3, the measured distances between the edge 10A and the ridge corner 12A, and increase or decrease in the amount of overlap L.

The overlap measuring apparatus 1 constructed as described above makes it possible to confirm visually the amounts of overlap L relative to the images. At the same time, it is possible to know the state of overlapping from the measured results. Accordingly, the acceptance or rejection of the amount of overlap L can be determined easily in the subsequent judgment of the overlap.

Note that the measurement results shown in FIG. 6 represent the case where the desired amount of overlap L is when the distance between the edge 10A and the ridge corner 12A is 7.99 mm.

Firstly, in the measurement of the amount of overlap L in the left frame P1, there was a failure in the detection of "ridge corner 12A and edge 10A" in block Q2 and a success in the detection of "ridge corner 12A and edge 10A" in block Q1. And the distance between the ridge corner 12A and the edge 10A was measured as 7.81 mm. That is, the measurement showed a value 0.18 mm shorter than the desired distance between the ridge corner 12A and the edge 10A, indicating an increase of 0.18 mm over the desired amount of overlap L.

Next, in the measurement of the amount of overlap L in the central frame P2, there was a success in the detection of the ridge corner 12A and the edge 10A in block Q2, and the distance between the ridge corner 12A and the edge 10A was measured as 8.27 mm. That is, the measurement showed a value 0.28 mm longer than the desired distance between the ridge corner 12A and the edge 10A, indicating a decrease of 0.28 mm from the desired amount of overlap L.

Next, in the measurement of the amount of overlap L in the right frame P3, there was a failure in the detection of "ridge corner 12A and edge 10A" in block Q2, a failure in the detection of "ridge corner 12A and edge 10A" in block Q1, and a success in the detection of "ridge corner 12A and edge 10A" in block Q3. And at this time, the distance between the ridge corner 12A and the edge 10A was measured as 8.57 mm. That is, the measurement showed a value 0.58 mm longer than the desired distance between the ridge corner 12A and the edge 10A, indicating a decrease of 0.58 mm from the desired amount of overlap L.

In other words, the overlap of the rear end Y on the front end H was such that the amount of overlap L reduced incrementally from left frame P1 to right frame P3 in a slanting manner.

The overlap measuring apparatus implementing the above-described embodiment of the present invention measures an overlap of the front end and the rear end of a sheet-shaped member when the sheet-shaped member having been molded into a predetermined length with molding marks on the surface extending in the width direction thereof is wound around the periphery of a molding drum from the front end. Of the apparatus, a detecting means detects a first molding mark formed on the surface of the sheet-shaped member on the rear end side and a second molding mark formed on the surface of the sheet-shaped member on the front end side by capturing images of the entire area surrounding the overlap from above by image capturing means. And a calculating means calculates the amount of overlap by measuring the distance between the first molding mark and the second molding mark on the sheet-shaped member from the frames of captured images.

According to this arrangement, a first molding mark on the front end side and a second molding mark on the rear end side of a sheet-shaped member are detected in an image of a predetermined area including the overlap. Then the amount of overlap is calculated from the distance between the first molding mark and the second molding mark. This allows for accurate measurement of the amount of overlap. The first molding mark and the second molding mark to be found in the images result from the molding of the sheet-shaped member. Hence, the distance between them must normally be constant. Also, the sheet-shaped member is previously molded in such a manner as to produce an optimal amount of overlap when it is wound around the molding drum.

Accordingly, when the sheet-shaped member gets deformed during conveyance before the winding process or when it is not correctly wound around the molding drum, there occurs variation in the relationship between the first molding mark and the second molding mark. To solve this problem, a value is set in advance for the distance between the first molding mark and the second molding mark when the sheet-shaped member is wound around the molding drum. And the distance between the first molding mark and the second molding mark when the sheet-shaped member is wound around the molding drum is measured. Then the increase or decrease of the amount of overlap is checked by comparing the measured value against the known distance between the first molding mark and the second molding mark. In this manner, the amount of overlap can be measured with excellent accuracy.

Moreover, the overlap is captured from above in a 2D, or planar, image, and the distance between the first molding mark and the second molding mark is measured from the image. As the result, the amount of overlap can be measured with accuracy without being affected by the surface unevenness, warpage, or lifting of the overlap or 3D variation in the thickness of the sheet-shaped member.

Also, another embodiment of the invention relates to a method for measuring an amount of overlap of a front end and a rear end of a sheet-shaped member when the sheet-shaped member having been molded into a predetermined length with molding marks on the surface extending in the width direction thereof is wound from the front end thereof around a molding drum. The method includes the step of detecting a first molding mark formed on the surface of the sheet-shaped member on the rear end side and a second molding mark formed on the surface of the sheet-shaped member on the front end side by capturing images of an entire area surrounding the overlap from above by image capturing means and the step of calculating the amount of overlap by measuring the distance between the first molding mark and the second molding mark on the sheet-shaped member from the frames of the captured images. Thus, the first molding mark on the front end side and the second molding mark on the rear end side of the sheet-shaped member are detected from within an image capturing a predetermined area including the overlap, and the amount of overlap is calculated from the distance between the first molding mark and the second molding mark. This can accomplish accurate measurement of the amount of overlap.

Also, in another embodiment of the method for measuring an amount of overlap, the step of detecting is such that the image is divided into blocks whose width is narrower than that of the frame, the image of each of the blocks is divided into a first region on the first molding mark side of the sheet-shaped member and a second region on the second molding mark side of the sheet-shaped member, and the first molding mark and the second molding mark are detected independently of each other, in which each of the detections is carried out in each of the blocks. This can accomplish the measurement of the amount of overlap with greater accuracy. That is to say, the frame of image is divided into blocks whose width is narrower than that of the frame, and the amount of overlap of the sheet-shaped member is measured from the images of the respective blocks. As a result, it is possible to detect the variation in the amount of overlap within the frame. Also, the image of each of the blocks is divided into a first region including the first molding mark and a second region including the second molding mark, and the first molding mark and the second molding mark are detected, which enables the detection of the state of overlapping. For example, when the first molding mark on the rear end side is not detected from the first region, it can be determined that there is a lifting, warpage, or the like in the overlap.

Also, in still another embodiment of the method for measuring an amount of overlap, the step of detecting further includes detecting pixels having luminance values at or above a threshold value from the gray values in the first region and determining a straight line of the detected pixels ranging linearly as a first molding mark, and detecting pixels having luminance values at or above a threshold value from the gray values in the second region and determining a straight line of the detected pixels ranging linearly as a second molding mark. As a result, it is possible not only to measure the amount of overlap but also detect the state of overlapping. That is, the first molding mark and the second molding mark have 3D variation on the sheet-shaped member, which can cause shadows and the like in the images captured. This may result in differences in gray values between the overlap and the other parts in the image. Hence, the first molding mark and the second molding mark in the image can be detected with certainty by separating the first molding mark and the second molding mark from the other parts by comparing the gray values in the image against the threshold value.

Also, in yet another embodiment of the method for measuring an amount of overlap, the step of calculating includes calculating an amount of overlap based on the relationship between the distance between the first molding mark and the second molding mark on the sheet-shaped member and the distance of the front end of the sheet-shaped member to the first molding mark and the distance of the rear end of the sheet-shaped member to the second molding mark in the overlap. This will ensure accurate measurement of the amount of overlap.

Also, in still another embodiment of the method for measuring an amount of overlap, the first molding mark on the sheet-shaped member captured by the image capturing means is a corner portion on the surface of the L-shaped stepped portion and the second molding mark is one of the corners of a rectangular protrusion formed on the surface of the sheet-shaped member. As a result, the amount of overlap can be measured with excellent accuracy.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention.

For example, in the foregoing embodiments, a description has been given on the assumption that the frames of images captured by the cameras are each divided into three blocks. However, the arrangement may be such that the frames are each divided into two left and right blocks and the pixels constituting straight lines are detected using a different threshold value. Moreover, the frames may each be divided into four or more blocks, and edges and ridges corresponding to straight lines may be detected of the pixels by setting different threshold values for the respective blocks.

In the foregoing embodiments, a description has been given on the assumption that a length of carcass ply 10 equivalent to a full circle of the molding drum 23 is wound around the molding drum 23, and the amount of overlap L of the winding start end and the winding completion end of the carcass ply 10 is measured. However, the overlap measuring apparatus according to the present invention can measure the amount of overlap of carcass plies on top of each other even when a plurality of carcass plies each shorter than a full circle of the molding drum 23 are overlapped on top of each other and wound around the periphery of the molding drum 23.

Also, the description thus far has been given on the assumption that the sheet-shaped member is a carcass ply. However, the sheet-shaped member, which is the object to be measured, is not limited to the carcass ply. It may be any sheet-shaped member, such as belts, reinforced with cords, or sheet-shaped members, such as uncured rubber sheets. These sheet-shaped members are molded by shaping dies such that the molding marks, such as the linear ridges as described in the foregoing embodiments, remain on their surfaces. Therefore, these molding marks may be used as the feature points in the measurement of the distance between the sheet-shaped members themselves.

Also, the description thus far has been given on the assumption that the ridge corner 12A of the ridge 12 is detected. However, even when the hind corner 12Q of the ridge 12 as shown in FIG. 2 is detected, the amount of overlap L can be calculated by taking into consideration the known width dimension of the ridge. Also, in a similar manner, even when the edge 10Q, instead of the edge 10A, is detected, it is possible to calculate the amount of overlap L. Or the interval dimension between either of the edge 10A and the edge 10Q and either of the ridge corner 12A and the ridge corner 12Q may be detected.

Also, when the carcass ply 10 is of such type that the rear end Y is simply cut off in the width direction and therefore has no stepped portion S, the amount of overlap L can be detected by detecting the edge of the winding completion end on the surface of the carcass ply 10.

Also, as for the rear end Y, not the edge 10A or the edge 10Q, but the ridge 12m formed on the hind side surface, as shown in FIG. 3, may be detected, and the interval to the ridge 12m on the surface of the completion end side at the winding start end may be calculated. This will allow the detection of the amount of overlap L even when there is some lifting on the rear end Y side.

Also, the number of cameras 31 is not limited to three, but it may be any practicable number. For example, one camera may be moved to left and right and stopped at predetermined positions (e.g., left end, center, right end) for image capturing. Or two cameras may be used when the edge 10 is narrow in width. Also, the image capturing frames P1 to P3 have been described as the ranges for capturing the entirety including the edge 10A and the ridge corner 12A. However, they may be the ranges for capturing the edge 10A and the ridge corner 12A individually.

DESCRIPTION OF REFERENCE NUMERALS 10 carcass ply
10A edge
12 ridge
12A ridge corner
23 molding drum
31 image capturing means
32 processing means
33 frame dividing unit
34 region dividing unit
35 edge detecting unit
36 ridge detecting unit
37 overlap calculating unit
H front end
P: P1 to P3 frame
Q: Q1 to Q3 block
R1, R2 region
Y rear end
α, β, γ threshold value

The invention claimed is:

1. An overlap measuring apparatus for measuring an amount of overlap of a front end and a rear end of a sheet-shaped member when the sheet-shaped member having been molded into a predetermined length with molding marks extending on the surface in width direction thereof is wound from the front end thereof around the periphery of a molding drum, the apparatus comprising:
a camera; and
a processor that is configured to:
detect a first molding mark formed on the sheet-shaped member on the rear end side and a second molding mark formed on the sheet-shaped member on the front end side by capturing images of an entire area including the overlap from above with the camera; and
calculate the amount of overlap by measuring the distance between the first molding mark and the second molding mark on the sheet-shaped member from frames of captured images,
wherein when the processor detects the first molding mark and the second molding mark, the image is divided into blocks whose width is narrower than that of the frame, the image of each of the blocks is divided into a first region on the first molding mark side of the sheet-shaped member and a second region on the second molding mark side thereof, and the first molding mark and the second molding mark are detected independently in each other for each of the blocks.

2. A method for measuring an amount of overlap of a front end and a rear end of a sheet-shaped member when the sheet-shaped member having been molded into a predetermined length with molding marks extending on the surface in width direction thereof is wound from the front end thereof around the periphery of a molding drum, the method comprising:
detecting, via a processor, a first molding mark formed on the sheet-shaped member on the rear end side and a second molding mark formed on the sheet-shaped member on the front end side by capturing images of an entire area including the overlap from above with a camera;
calculating, via the processor, the amount of overlap by measuring the distance between the first molding mark and the second molding mark on the sheet-shaped member from frames of captured images,
wherein in the step of detecting, the image is divided into blocks whose width is narrower than that of the frame, the image of each of the blocks is divided into a first region on the first molding mark side of the sheet-shaped member and a second region on the second molding mark side thereof, and the first molding mark and the second molding mark are detected independently in each other for each of the blocks.

3. The method for measuring an amount of overlap according to claim 2, wherein the step of detecting further comprises detecting pixels having luminance values at or above a threshold value from the gray values in the first region and determining a straight line of the detected pixels as a first molding mark, and detecting pixels having luminance values at or above a threshold value from the gray values in the second region and determining a straight line of the detected pixels as a second molding mark.

4. The method for measuring an overlap according to claim 3, wherein the step of calculating comprises calculating an amount of overlap based on the distance between the first molding mark and the second molding mark on the sheet-shaped member and the relationship between the distance of the front end of the sheet-shaped member at the overlap to the first molding mark and the distance of the rear end of the sheet-shaped member to the second molding mark.

5. The method for measuring an amount of overlap according to claim 4, wherein the first molding mark on the sheet-shaped member captured by the image capturing means is a corner portion on the surface of the L-shaped stepped portion and the second molding mark is one of the other corners of a rectangular protrusion formed on the surface of the sheet-shaped member.

6. The method for measuring an amount of overlap according to claim 3, wherein the first molding mark on the sheet-shaped member captured by the image capturing means is a corner portion on the surface of the L-shaped stepped portion and the second molding mark is one of the other corners of a rectangular protrusion formed on the surface of the sheet-shaped member.

7. The method for measuring an overlap according to claim 2, wherein the step of calculating comprises calculating an amount of overlap based on the distance between the first molding mark and the second molding mark on the sheet-shaped member and the relationship between the distance of the front end of the sheet-shaped member at the overlap to the first molding mark and the distance of the rear end of the sheet-shaped member to the second molding mark.

8. The method for measuring an amount of overlap according to claim 7, wherein the first molding mark on the sheet-shaped member captured by the image capturing means is a corner portion on the surface of the L-shaped stepped portion and the second molding mark is one of the other corners of a rectangular protrusion formed on the surface of the sheet-shaped member.

9. The method for measuring an amount of overlap according to claim 2, wherein the first molding mark on the sheet-shaped member captured by the image capturing means is a corner portion on the surface of the L-shaped stepped portion and the second molding mark is one of the other corners of a rectangular protrusion formed on the surface of the sheet-shaped member.

* * * * *